United States Patent [19]
Osborn et al.

[11] 3,830,067
[45] Aug. 20, 1974

[54] IRRIGATION SYSTEM

[75] Inventors: Robert O. Osborn, Chesterfield Co., Va.; Donn G. Boyle, Lockport, N.Y.

[73] Assignee: Boyle and Osborn, Lockport, N.Y.

[22] Filed: Aug. 6, 1970

[21] Appl. No.: 61,661

[52] U.S. Cl. ................................ 61/12, 239/145
[51] Int. Cl. ............................................ E02b 13/00
[58] Field of Search .......... 61/12, 13; 138/128, 156; 239/145

[56] References Cited
UNITED STATES PATENTS

| | | | |
|---|---|---|---|
| 31,614 | 3/1861 | Mayall | 138/128 X |
| 1,989,427 | 1/1935 | Robey | 61/12 X |
| 2,381,367 | 8/1945 | Quayle | 138/128 |
| 2,763,991 | 9/1956 | Kennon | 61/13 |
| 2,807,505 | 9/1957 | Weitzel | 61/12 X |
| 3,302,408 | 2/1967 | Schmid | 61/13 |
| 3,744,256 | 7/1973 | Cobb et al. | 61/13 |

FOREIGN PATENTS OR APPLICATIONS

| | | | |
|---|---|---|---|
| 6,916,418 | 5/1970 | Netherlands | 61/13 |

*Primary Examiner*—Mervin Stein
*Assistant Examiner*—David H. Corbin
*Attorney, Agent, or Firm*—Ashlan F. Harlan, Jr.

[57] ABSTRACT

An irrigation system, particularly for subsurface irrigation comprises flexible tubing having a portion of the surface thereof composed of a permeable, fibrous material through which water may pass at a slow, controlled rate with a negligible pressure drop in the system. The flexible tubing is preferably formed from two superposed strips or webs of thermoplastic material, at least one of which is permeable, heat sealed along their edges.

14 Claims, 9 Drawing Figures

INVENTORS.
Donn G. Boyle and
BY Robert O. Osborn

Ashlan F. Harlan Jr.
ATTORNEY.

3,830,067

PATENTED AUG 20 1974    SHEET 2 OF 2

INVENTORS.
Donn G. Boyle and
BY Robert O. Osborn
Ashlan L. Harlan Jr.
ATTORNEY.

IRRIGATION SYSTEM

BACKGROUND OF THE INVENTION

The present invention relates generally to irrigation systems and, more particularly, to subsurface irrigation systems and to flexible conduits or tubing particularly adapted for irrigation systems.

Surface irrigation systems in which a network of troughs or ditches is formed in the earth's surface for conveying and distributing water to plants, trees and the like in arid areas or those afflicted with a drought are well known. Also, it is well known to employ underground piping systems for conveying water to outlets or sprinkler heads disposed at or above ground level for discharging or spraying such water on adjacent vegetation. Although these systems are often admirably suited for the purposes for which they were designed, they also have certain disadvantages. For example, in open ditch irrigation water wastage from evaporation and deep seepage in porous soils can be extensive. On the other hand, in non-porous soils water tends to collect and stagnate in pools thereby creating pollution problems and providing breeding areas for mosquitoes and other insects. In the use of sprinkler or spray systems, insecticides are often washed off plants, thereby aborting their purpose and needlessly contaminating the soil. Also, in some instances, the resultant wet foliage promotes plant diseases.

In view of experience with the above-mentioned systems, it has been found that underground or subsurface irrigation systems offer many advantages over surface irrigation systems. However, subsurface systems have in many instances been impracticable because of the high cost of providing and laying out suitable piping and the expensive accessory equipment such as high pressure pumps, flow regulating devices, and the like, required with such systems. Moreover, their performance has often been unsatisfactory since the water outlet perforations or orifices in these underground pipes become clogged, thus reducing efficiency and making it even more difficult to control properly the rate of flow of water delivered therefrom and to confine the delivered water to the desired area.

SUMMARY OF THE INVENTION

The irrigation system of the present invention obviates the above disadvantages by employing for distribution of water, particularly in a subsurface irrigation system, novel flexible tubing. Such tubing, having at least a portion of the surface thereof composed of a permeable, fibrous material through which water may pass at a slow, controlled rate with a negligible pressure drop through the system, is inexpensive to manufacture and install and is capable of confining the delivered water to the desired areas only.

Generally speaking, the novel flexible tubing of the present invention is characterized as a tubular body formed by joining together, along their longitudinal edges only, a plurality of elongated flexible strips of plastic or other suitable and similar materials. At least one of said strips is composed of a permeable, fibrous material, preferably a non-woven fabric, capable of slowly passing a liquid, such as water, or a gas. Another of said strips may be solid and impervious or may be formed of the same or a different permeable, fibrous material. If desired, additional strips of suitable material may be incorporated in the tubing for purposes set forth hereinafter.

DESCRIPTION OF PREFERRED EMBODIMENTS

Figure 1:
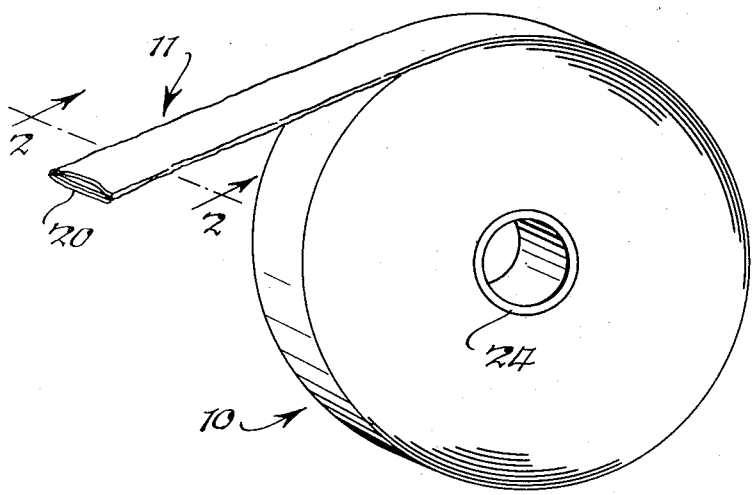
FIG. 1 is a perspective view of a roll of the novel flexible tubing of the present invention with a layer of parting material between the convolutions of tubing.
Figure 3:
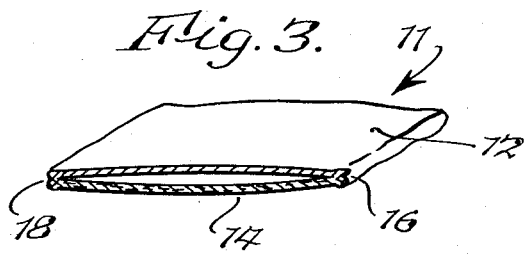
FIG. 3 is a perspective end view similar to FIG. 2, with the parting material removed.

Referring now in detail to the drawings, FIG. 1 shows a roll 10 of flattened, flexible tubing 11 having a layer 20 of parting material thereon. Tubing 11, as shown in detail in FIG. 3, is a simple form of flexible tubing which is particularly useful in subsurface irrigation. The tubing 11 comprises a first side 12 and a second side 14 joined together along their longitudinal edges as at 16 and 18, respectively. The side 12 is preferably composed of flexible, impermeable, thermoplastic material but may be formed of any suitable impermeable material available in web or strip form. The side 14 is preferably formed of a flexible, non-woven, fibrous, thermoplastic material, such as the spun-bonded, polyethylene, non-woven fabric sold under the name "TYVEK" (a registered trademark of E. I. duPont de Nemours and Company), but may be formed of any suitable flexible, fibrous material which is available in web or strip form and which will permit the slow passage therethrough of a liquid, e.g., water, by seeping or a "wicking" action. The sides 12 and 14 of tubing 11 are preferably composed of heat-weldable thermoplastic materials to enable the longitudinal edges thereof to be readily heat-sealed together.

Figure 2:
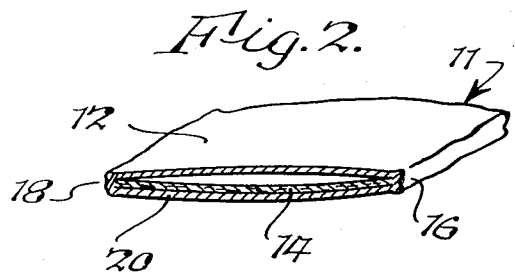
FIG. 2 is an enlarged perspective end view, taken on line 2—2 of FIG. 1, of the tubing and parting material layer shown in FIG. 1.

A convenient and economical method of making tubing of the type described is set forth in copending U.S. Pat. application Ser. No. 61,660 filed concurrently herewith. According to such method, two webs of heat-weldable, flexible, thermoplastic material corresponding to sides 12 and 14 in the instant application and a flexible web of non-thermoplastic, parting material, such as tissue paper 20 (see FIG. 2), are wound on a spool or mandrel to form a composite roll. The roll is then sliced into discrete discs of approximately the same thickness as the width of the flattened tubing desired and the flat side faces of said discs are subjected to heat to fuse the longitudinal edges of the thermoplastic strips together in a fluid tight relation. Thus, there is produced a continuous length of tubing 11, wound flat as a roll 10 on a spool 24 which can be stored and transported in a compact, easy to handle form and readily unwound for use. To use the tubing 11, it is simply unwound from the spool and severed at any desired point, the layer of parting material 20 being removed and discarded or left in place, as desired.

Figure 8:
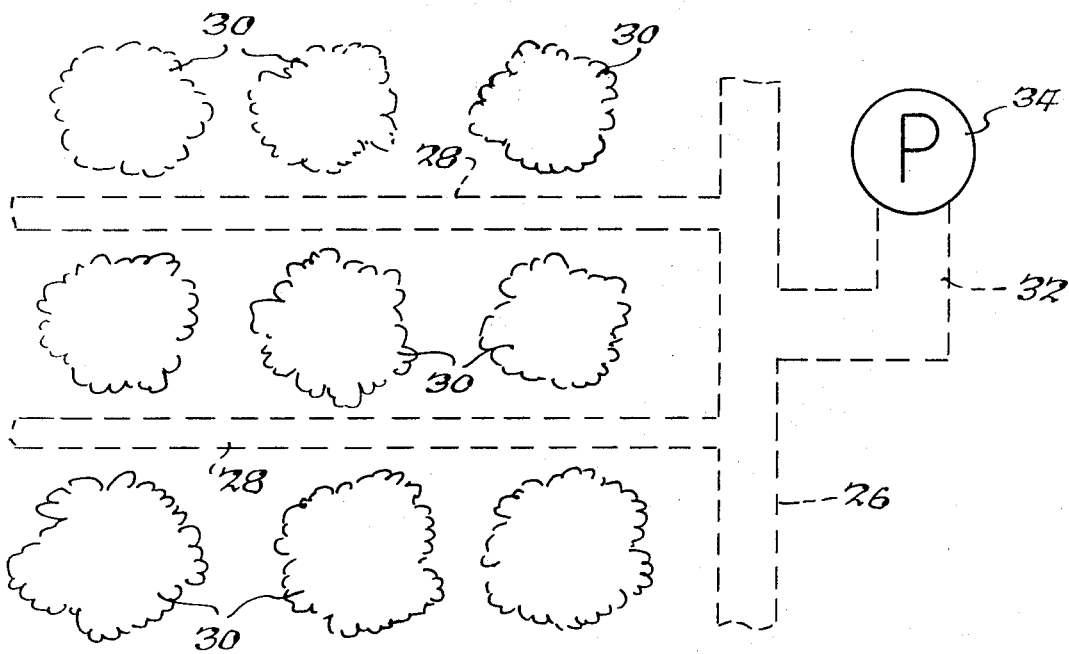
FIG. 8 is a plan view of an underground or subsurface irrigation system utilizing the novel tubing of the present invention.

FIG. 8 illustrates one specific use of the novel tubing in an underground or subsurface irrigation system. For illustrative purposes, the irrigation system is shown as comprising a manifold or main line 26 having a plurality of distribution lines or branches 28, formed at least in part of tubing such as shown in FIG. 3, extending laterally therefrom and disposed beneath the surface of the soil and between rows of bushes or plants 30. The manifold 26 and branches 28 are supplied with water through a feed line 32 and a pump 34 from a suitable source (not shown). The free ends of the branches 28 may be heat-sealed or closed in any other suitable manner. The particular arrangement of the branches 28 and manifold 26 depicted in FIG. 8 is exemplary only and it should be understood that any suitable number of branches arranged in any desired or convenient pattern is contemplated within the purview of this invention. For example, various branches 28 can be of different sizes, may be disposed at different vertical levels, curved in any desired path, and extend in any desired direction to any desired length. It will also be obvious that the flow characteristics of the different branches, or even portions of the same branch, may be different to provide the optimum water supply to different types of vegetation.

It will be evident that in an irrigation system according to the present invention the water is not forced through orifices punched or drilled in the distribution lines. Rather, it is released through a large pervious area, at least half of the inside wall of the distribution lines or branches. Indeed, if the distribution lines are merely kept filled, the pervious fibrous side or sides of the tubing will act as wicks to transfer appreciable water from the inside to the outside thereof. Since a very low pressure or head is required, the heavy duty pumps, pressure regulators, and attendent hardware necessary for the usual subsurface irrigation systems are not needed. The slow seepage of the water from the branches 28 at a controllable uniform rate over a large area of the tubing permits the saving of water since it may be released at such a rate as to provide water only in desired areas of the soil.

As a consequence of these factors mentioned above, a subsurface irrigation system according to the present invention is not only inexpensive to install, since the tubing, itself inexpensive, is merely laid out in covered trenches, but is economical in operation. It may be noted that the "wicking" action described above is not interfered with by slimes, silt, and the like, whereas flow through orifices may be at least partially blocked thereby. Although, as described above, the irrigation system utilizes flexible tubing in the distribution lines or branches 28, it will be understood that the manifold 26 and feed line 32 may also be of flexible tubing, if desired, and that such tubing may be pervious in whole or in part. Also, of course, since the permeability of flexible tubing according to the invention can be varied by the use therein of fibrous material having the desired porosity, it is possible to have different flow characteristics in different portions of an irrigation system even when using tubing of uniform size.

Figure 4:
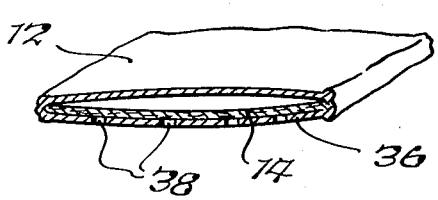
FIGS. 4–7 are views similar to FIG. 3, illustrating various modified forms of tubing according to the present invention.
Figure 5:
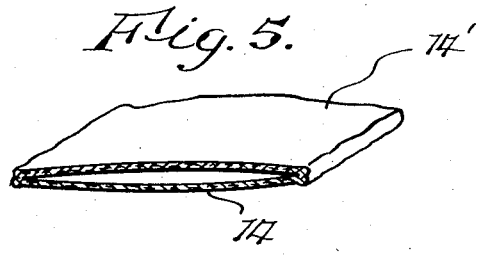
Figure 6:
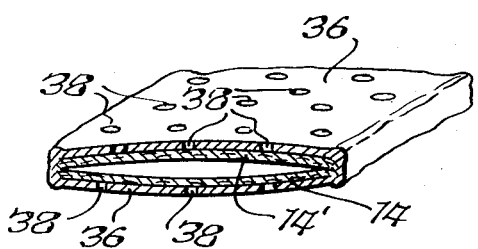

FIGS. 4, 5 and 6 illustrate other forms of flexible tubing according to the present invention which are similar to the form of tubing shown in FIG. 3, but comprise strips or layers of flexible thermoplastic material which are different in kind and/or number from those used in the form illustrated in FIG. 3.

The modified form shown in FIG. 4 has an additional flexible strip or layer or strip 36 which is provided with a plurality of perforations 38. The strip 36 is of heat-weldable thermoplastic material and the three-component tubing may be readily produced by the method set out in the above-mentioned copending application or by other known procedures in which the longitudinal edges of the strips are sealed together. It will be evident that the perforated strip 36 protects the permeable fibrous strip 14 against damage in handling and provides additional strength to the tubing. The number, size, and arrangement of the perforations 38 may vary as desired. However, the perforations should be large enough to preclude their becoming clogged by soil and, preferably, should all be arranged between the edges of the layer or strip 36.

The modified form of tubing shown in FIG. 5 differs from that shown in FIG. 3 in that the impermeable strip 12 of the latter is replaced by a permeable or pervious flexible strip 14' composed of a thermoplastic, fibrous material which may be identical with the strip 14 or may be of a different material. This modified form of tubing allows water to seep or ooze through substantially the entire circumferential surface of the tubing, rather than through only about half of the surface, as in the forms shown in FIGS. 3 and 4.

FIG. 6 illustrates still another modified form of flexible tubing comprehended by this invention, which form is similar to the form shown in FIG. 5 but incorporates a feature from the form shown in FIG. 4. In FIG. 6 both flexible strips 14 and 14' are permeable, as above described, and the tubing also comprises a flexible thermoplastic strip 36 having perforations 38 therein, also as above described, on the outer side of each of the strips 14 and 14'. Thus the tubing is given additional strength and resistance to damage. As in the forms previously described the several superposed strips are bonded together along their edges, preferably by heat-sealing.

Figure 7:
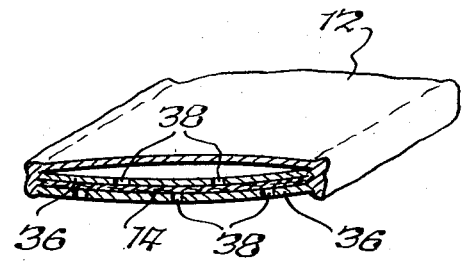

FIG. 7 illustrates yet another modified form of tubing in accordance with the present invention. This form is similar to the form illustrated in FIG. 4 but has a second perforated strip 36 interposed on the inner side of the permeable, fibrous strip 14. The permeable strip is thus additionally reinforced and by suitable choice of the relative size and arrangement of the perforations 38 in the two strips 36, the rate of flow of liquid through the permeable strip 14 at a given pressure may be predetermined.

Figure 9:
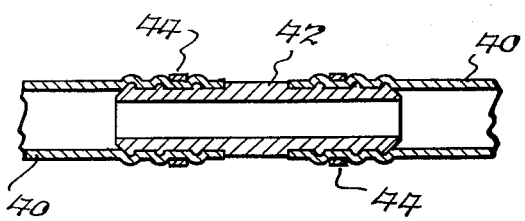
FIG. 9 is a detail view, showing how spliced connections are formed with tubing according to the present invention.

It will be evident that lengths or sections of the novel, flexible, pervious or permeable tubing of the present invention can be joined together as desired to provide any required length. A simple, inexpensive way to join together such sections is illustrated in FIG. 9. As there shown, the ends of tubing sections 40 are merely placed over the ends of a tubular nipple 42 and held in place thereon by clamping means 44. Such means may be a metal or plastic mechanical clamp or may be merely a ring of a heat-shrinkable plastic, for example, an irradiated polyolefin or polyvinyl chloride, which when heated to cause shrinking thereof, firmly clamps the tubing on the nipple.

As previously stated, the flexible strips from which tubing according to the present invention is formed are preferably of heat-weldable thermoplastic. Various thermoplastic materials may be employed, the choice being influenced by cost, degree of flexibility and durability desired, and the environment in which the tubing will be used. Among generally suitable thermoplastic materials are polyolefins, polyvinyl chloride, fluorinated hydrocarbons, polyesters, nylons, polyacrylates, other polymerized vinyl esters and vinyl copolymers, and silicone rubber. However, as pointed out below, non-thermoplastic, flexible strips may be employed if desired. It may be pointed out here that, if desired, any or all of the strips used in forming the present novel tubing may be reinforced with embedded wires or filaments, e.g., glass fibers. It may also be noted that the wicking action of the novel pervious tubing can be aided by initially incorporating in the water (by suitable means not shown) a small amount of a surface active or wetting agent. Although there are many other suitable wetting agents, alkyl aryl sulfonates and lauryl sulfonic acids have been found quite satisfactory. The agents may be employed in amounts as small as 0.1 percent or less in some instances. Only a short initial period of use is necessary even with hydrophobic materials.

In addition to the several embodiments of the present invention specifically described above and illustrated, the present invention also comprehends flexible tubing made from other combinations of strips of a pervious or permeable fibrous material in either woven or non-woven form, an impermeable material, and an impermeable material having perforations therethrough, the strips being firmly bonded together along their longitudinal edges. In some cases it may be desirable to utilize a strip of flexible non-thermoplastic material as a portion of tubing according to the present invention. In many instances this presents no great problem since the thermoplastic strip or strips with which it is in contact will, when heated, adhere and bond to the edges of the non-thermoplastic strip to give a fluid tight seal. It will be appreciated that heat-sealing of the edges of the tubing when a strip of non-thermoplastic material is employed will often be easier, particularly in the absence of preheating the entire disc-like composite rolls, if the non-thermoplastic material is fibrous in character, e.g., non-woven fabric formed from asbestos or glass fibers, since penetration of the softened thermoplastic material thereinto aids bonding.

It will also be understood that tubing according to the present invention may be made by methods other than that disclosed in the above-mentioned copending U.S. patent application. Thus, for example, heat-sealing of the edges of the tubing when a thermoplastic strip or strips are employed in forming it may be accomplished by passing the edges between heated rollers. Also, of course, adhesives may be used or a suitable solvent which softens the edges of the strips to permit bonding them with pressure.

Not only is the composite, flexible, pervious tubing of the present invention particularly adapted for use in systems for subsurface irrigation, but it also has utility for surface irrigation and other purposes. Indeed, it may be employed wherever it is desired to release fluids, either liquid or gaseous, along the length of a line of conduit. Thus, it is useful in the aeration of soil and water and can also be used to supply treating materials, for example, disinfectants or nutrients, to soil or water. Tubing according to the invention is particularly useful for such purposes because of its capability of slowly passing fluids into an ambient atmosphere or other environment at a uniform, controlled rate, under a minimum of applied pressure.

It is evident that the materials used in forming flexible tubing according to the present invention and their form and thickness will be determined by the intended usage of the tubing and that the materials in one portion of a length of tubing may vary from those in another portion. In general, the thickness of the strips used may vary from about 0.025 mm to about 0.25 mm. It will be understood that when in the present application reference is made to a permeable material, materials having substantial permeability or perviousness, such as that characteristic of fabrics, are meant. Obviously, from the foregoing description, a material having a degree of permeability such as to permit only molecular diffusion of gases or liquids therethrough would be unsuitable for use in the present process.

We claim:

1. In a low-pressure irrigation system, means for distributing water comprising flexible tubing formed at least in substantial part of a permeable, non-woven fabric, which fabric consists essentially of thermoplastic fibers, said tubing being substantially flat when empty but being capable of easily assuming a rounded configuration in cross section.

2. An irrigation system as set forth in claim 1 in which said thermoplastic fibers are of a polyolefin.

3. An irrigation system as set forth in claim 1 in which said fabric is a spun-bonded, fibrous polyethylene fabric.

4. An irrigation system as set forth in claim 1 in which said flexible tubing comprises a plurality of superposed flexible strips firmly joined along their longitudinal edges in sealed relation, at least one of said strips being of said permeable, non-woven fabric.

5. An irrigation system as set forth in claim 4 in which a plurality of said strips are of said permeable, non-woven fabric.

6. An irrigation system as set forth in claim 5 in which said fabric is a spun-bonded, fibrous, polyethylene fabric.

7. An irrigation system as set forth in claim 6 in which said fabric has a thickness between about 0.025 mm and about 0.25 mm.

8. A low-pressure irrigation system which comprises a manifold, means for supplying water to said manifold, and a plurality of distribution branches communicating with said manifold, each of said branches comprising flexible tubing formed at least in substantial part of a permeable, non-woven fabric, which fabric consists essentially of thermoplastic fibers, said tubing being substantially flat when empty but being capable of easily assuming a rounded configuration in cross section, and communication between the inside of said tubing and the outside thereof being provided by pores in said fabric.

9. An irrigation system as set forth in claim 8 in which said thermoplastic fibers are of a polyolefin.

10. An irrigation system as set forth in claim 8 in which said fabric is of spun-bonded, fibrous, polyethylene fabric.

11. An irrigation system as set forth in claim 8 in which said flexible tubing comprises a plurality of superposed flexible strips firmly joined along their longitudinal edges in sealed relation, at least one of said strips being of said permeable, non-woven fabric.

12. An irrigation system as set forth in claim 11 in which a plurality of such strips are of said permeable, non-woven fabric.

13. An irrigation system as set forth in claim 12 in which said fabric is a spun-bonded, fibrous, polyethylene fabric.

14. An irrigation system as set forth in claim 13 in which said fabric has a thickness between about 0.025 mm and about 0.25 mm.

* * * * *